United States Patent [19]
Guinta et al.

[11] Patent Number: 6,092,060
[45] Date of Patent: *Jul. 18, 2000

[54] COMPUTER-AIDED METHODS AND APPARATUS FOR ASSESSING AN ORGANIZATIONAL PROCESS OR SYSTEM

[75] Inventors: Lawrence R. Guinta; Lori A. Frantzve, both of Scottsdale, Ariz.

[73] Assignee: Tech-Metrics International, Inc., Scottsdale, Ariz.

[ * ] Notice: This patent is subject to a terminal disclaimer.

[21] Appl. No.: 09/055,914

[22] Filed: Apr. 6, 1998

Related U.S. Application Data

[63] Continuation of application No. 08/351,896, Dec. 8, 1994, Pat. No. 5,737,494.

[51] Int. Cl.[7] ................................................. G06F 17/00
[52] U.S. Cl. ................................ 706/47; 706/45; 706/46; 706/61; 705/7; 705/10
[58] Field of Search ................................. 706/12, 45–47, 706/61, 925, 926; 705/7, 10

[56] References Cited

U.S. PATENT DOCUMENTS

| | | | |
|---|---|---|---|
| 4,764,120 | 8/1988 | Griffin et al. | 434/336 |
| 4,905,163 | 2/1990 | Garber et al. | 706/55 |
| 5,211,564 | 5/1993 | Martinez et al. | 434/323 |
| 5,227,874 | 7/1993 | Von Kohorn | 705/10 |
| 5,496,175 | 3/1996 | Oyama et al. | 434/118 |
| 5,627,973 | 5/1997 | Armstrong et al. | 705/10 |
| 5,704,029 | 12/1997 | Wright, Jr. | 707/505 |
| 5,759,101 | 6/1998 | Von Kohorn | 434/40 |
| 5,765,038 | 6/1998 | Flannery et al. | 707/10 |
| 5,999,908 | 12/1999 | Abelow | 705/1 |

OTHER PUBLICATIONS

American Society for Quality Control, "Malcomb Baldridge National Quality Award," 1993 Award Criteria, Booklet Item No. T997 (42 pages).

Mark R. Edwards, Ph.D., "Insight Profiles User's Guide," 1990, TEAMS Booklet (55 pages).

International Search Report on International Application No. PCT/US95/15930 mailed Mar. 5, 1996.

*Primary Examiner*—Tariq R. Hafiz
*Assistant Examiner*—Jason W. Rhodes
*Attorney, Agent, or Firm*—Conley, Rose & Tayon, P.C.

[57] ABSTRACT

Method and apparatus for computer-aided assessment of organizational process or system. Method and apparatus are adapted to display computer displayed questions to an assessor, who then inputs numerical inputs relative to the assessor's perception of the process or system. Filtering techniques inhibit entry of unsupported numerical inputs which may be untrue and/or exaggerated. Sequential questions used in combination provide more accurate assessment of the system or process, thereby enabling focused audits and/or inspections.

42 Claims, 9 Drawing Sheets

Fig. 5E

COMPUTER-AIDED METHODS AND APPARATUS FOR ASSESSING AN ORGANIZATIONAL PROCESS OR SYSTEM

This is a continuation of application Ser. No. 08/351,896 filed Dec. 8, 1994, now U.S. Pat. No. 5,737,494.

BACKGROUND OF THE INVENTION

I. Field of the Invention

This invention relates to various computer-aided methods and apparatus for assessing an organizational process or system. The term "assessing," as used herein, refers to gathering information about, and/or measuring or evaluating, at least one organizational process or system.

II. Description of the Related Art

Large entities such as corporations, professional associations, and government units typically use a wide variety of suppliers of goods and/or services. In this context "suppliers" means third party providers, as well as in-house divisions, subsidiaries, departments, and/or systems. These entities often attempt to optimize the quality of their suppliers, based on the theory that a high quality supplier typically provides high quality goods and/or services. One method of assessing suppliers involves on-site audits and inspections. Such audits and inspections, however, tend to be burdensome, expensive, and time consumptive for both the assessing entity and the supplier. Therefore, persons in the art have searched for methods and apparatus to enhance their ability to assess suppliers in more expedient and efficient ways.

One method of assessing suppliers involves asking representatives of the suppliers, or representatives who have worked with the suppliers, to answer questions and to provide information concerning organizational processes or systems used by the supplier. Such surveys may be used to assess characteristics of the supplier. A problem with surveys; however, is that validation of the accuracy and/or truthfulness of answers received is often difficult and/or expensive. That problem may be particularly acute when assessing interested persons such as suppliers of goods and services. The most informed and appropriate persons to be surveyed are often biased or interested parties. For instance, an assessing entity such as an automobile manufacturer may desire to assess whether its supplier of engines has appropriate inspection systems in place to minimize engine defects. In that instance, the most appropriate persons to question would likely be the engineers, managers, and other employees of the engine supplier. These persons, however, would also be interested parties that may provide biased, untruthful, or exaggerated answers in response to survey questions.

In sum, it has long been a belief in the assessment industry that surveys, while significantly less expensive and time consumptive, are also less accurate since it is difficult to determine whether answers provided are biased, untruthful, or exaggerated.

Despite the infirmities of surveys, cost and time considerations nevertheless dictate that surveys be used. One popular survey technique prompts the person answering the question (the assessor) to provide answers on a scale of 1 to 10, 1 to 100, or on a percentage basis.

Surveys may be efficiently presented to assessors using computer techniques. In one computer-aided survey, a sliding bar scale (often referred to as a "thermometer") is used to help the assessor provide answers on a scale.

In use, assessors using sliding bar scales "slide" the bar to a particular scale value which represents their perception or answer. Typically, arrow keys (on a keyboard) or a "mouse" may be coupled to a computer and used to "slide" the bar. Alternatively, the user may input a number. The software may then represent that number graphically by moving the thermometer bar to an appropriate location. One example of a survey that used a bar scale is a software program called Insight Profiles™ made by Teams (Tempe, Ariz.).

Prior assessment methods and apparatus have used a data gathering technique called "conditional response." This technique involves presenting an assessor a question, and based on the answer to the question, branching to one or more subsequent questions. Each subsequent question may then also branch to further subsequent questions based on answers provided. In this manner a complicated "tree" of questions and answers may be prepared.

One problem with the conditional response technique is that the assessment criteria which causes and/or directs branching is highly subjective. Thus the person developing the criteria may bias the survey. Furthermore, preparing or revising a conditional response survey tends to be difficult and expensive since the "tree" is highly structured, thus making preparation of the tree, or revisions to the tree, complicated, time-consumptive and cumbersome. For instance, if an early question in the tree is changed, then a whole series of subsequent "branching" questions may also have to be changed. Finally, one problem with the conditional response technique is that available answers tend to be binary in nature instead of analog. Many questions to real world problems, however, cannot be accurately answered with binary (i.e., "black or white") responses. Instead, accurate answers to these questions are often in analog form (e.g., in "shades of grey"). The conditional response technique is highly structured, and thus is a less preferred method for prompting such analog answers since multiple and expensive branching would be required if analog responses were elicited in a conditional response survey.

III. SUMMARY OF THE INVENTION

An embodiment of the invention relates to a method of using a computer to gather information about an organizational process or system, the method including:

displaying on a display device computer driven questions, at least some of the computer driven questions being adapted to prompt an assessor who has at least some knowledge about the organizational process or system to numerically input on an input device of the computer the assessor's perception of the capability of the organizational process or system to address an issue;

receiving a first numerical input from the input device of the computer, the first numerical input being stored in a memory of the computer, and the first numerical input reflecting the assessor's perception of the capability of the organizational process or system to address an issue;

comparing within a processing unit of the computer the first numerical input to a first value, and, if the first numerical input has a first predetermined characteristic in relation to the first value, then prompting the assessor to identify evidence that supports the first numerical input, and if evidence is identified that supports the first numerical input, then validating the first numerical input for subsequent evaluation, and if the evidence is not identified that supports the first numerical input, then inhibiting validation of the first numerical input until the evidence is identified or until the first numerical input is changed to have a second predetermined characteristic in relation to the first value;

displaying on the display device computer driven questions that are adapted to prompt the assessor to numerically input a second numerical input on the input device of the computer, the second numerical input reflecting the assessor's perception of how extensively the organizational process or system is deployed; and receiving a second numerical input from the input device of the computer, the second numerical input being stored in a memory of the computer, and the second numerical input reflecting the assessor's perception of how extensively the organizational process or system is deployed.

If evidence is not identified that supports the first numerical input, then a method (of an embodiment of the invention) may further include inhibiting the display of subsequent questions until the evidence is identified or until first numerical input is changed to have the second predetermined characteristic in relation to the first value.

A method may include prompting the assessor to input a third numerical input on an input device of the computer the assessor's perception of how well the organizational process or system functions to address the issue. A method may also include receiving the third numerical input from the input device, the third input being stored in a memory of the computer, and the third numerical input reflecting the assessor's perception of the results achieved by the organizational process or system.

A method may include comparing within a processing unit of the computer the second numerical input to a second value. If the second numerical input has a first predetermined characteristic in relation to the second value, then a method may include prompting the assessor to identify evidence that supports the second numerical input. If evidence is identified that supports the second numerical input, then a method may include validating the second numerical input for subsequent evaluation. If evidence is not identified that supports the second numerical input, then a method may include inhibiting validation of the second numerical input until the evidence is identified or until the second numerical input is changed to have a second predetermined characteristic in relation to the second value. If evidence is not identified that supports the second numerical input, then a method may include inhibiting the display of subsequent questions until the evidence is identified or until second numerical input is changed to have the second predetermined characteristic in relation to the second value.

A "predetermined characteristic" may be defined to mean that a numerical input has a value at least as great, greater than, equal to or less than, or less than the first value.

A method may include comparing within a processing unit of the computer the third numerical input to a third value. If the third numerical input has a first predetermined characteristic in relation to the third value, then a method may include prompting the assessor to identify evidence that supports the third numerical input. If evidence is identified that supports the third numerical input, then a method may include validating the third numerical input for subsequent evaluation. If the evidence is not identified that supports the third numerical input, then a method may include inhibiting validation of the third numerical input until the evidence is identified or until the third numerical input is changed to have a second predetermined characteristic in relation to the third value.

A method may include evaluating the organizational process or system by comparing numerical inputs from the assessor with known empirically-gathered information. A method may include using the first and second numerical inputs together to evaluate the organizational process or system. For instance, a method may include multiplying, adding, subtracting, or dividing the first numerical input with the second numerical input, or vice versa, to evaluate the organizational process or system.

A method may include using differences (i.e., deviations) between the first numerical input and the second numerical input to evaluate the organizational process or system.

A method may include receiving first and second numerical inputs from a plurality of assessors, and determining the standard deviation of the first numerical input, and the standard deviation of the second numerical input, from the numerical inputs received from the assessors, and then using a standard deviation to evaluate at least a portion of the organizational process or system. The standard deviations may be used alone or in combination to evaluate the process or system.

The "evidence" may include visible or tangible evidence (e.g., system demonstrability). Such evidence may include supporting documentation. The evidence may include visible evidence such as system demonstrability, and the method may further include comparing within a processing unit of the computer the first numerical input to second value, and, if the first numerical input has a first predetermined characteristic in relation to the second value, the prompting the assessor to identify supporting documentation that supports the first numerical input. If supporting documentation is identified, then a method may include validating the first numerical value for subsequent evaluation. If supporting documentation is not identified, then a method may include inhibiting the validation of the first numerical input until the supporting documentation is identified or until the first numerical input is changed to have a second predetermined characteristic in relation to the second value.

A method may include prompting the assessor to input on the input device of the computer an assessment as to whether the organizational process or system is demonstrable. If an input is received from the input device that indicates that the organizational process or system is demonstrable, then a method may include validating the first numerical input. If an input is received from the input device that indicates that the organizational process or system is not demonstrable, then a method may include inhibiting validation of the first numerical input until the assessor changes the first numerical input to have a first determined characteristic in relation to a second value.

A method may include displaying at least one numerical input as a sliding bar on a display device.

An embodiment of the invention may be directed to a machine having a memory which contains data generated by the above-described methods. Such a machine may include a computer comprising a processing unit and a memory, the computer being connected to an input device and a display device.

An embodiment of the invention may be directed to an apparatus adapted to gather information about an organizational process or system, comprising a computer system, the computer system including:

a display device adapted to display computer driven questions;

an input device adapted to transfer inputs from an assessor;

a memory and a processing unit; and wherein the apparatus is adapted to:

display on the display device computer driven questions, at least some of the computer driven questions being adapted to prompt an assessor who has at least some knowledge about the organizational process or system to numerically input on the input device the assessor's perception of the capability of the organizational process or system to address an issue;

receive a first numerical input from the input device, the first numerical input being stored in a memory of the computer, and the first numerical input reflecting the assessor's perception of the capability of the organizational process or system to address an issue;

compare within the processing unit the first numerical input to a first value, and, if the first numerical input has a first predetermined characteristic in relation to the first value, then prompt the assessor to identify evidence that supports the first numerical input, and if evidence is identified that supports the first numerical input, then validate the first numerical input for subsequent evaluation, and if the evidence is not identified that supports the first numerical input, then inhibit validation of the first numerical input until the evidence is identified or until the first numerical input is changed to have a second predetermined characteristic in relation to the first value;

display on the display device computer driven questions that are adapted to prompt the assessor to numerically input a second numerical input on the input device of the computer, the second numerical input reflecting the assessor's perception of how extensively the organizational process or system is deployed; and receive a second numerical input from the input device, the second numerical input being stored in a memory of the computer, and the second numerical input reflecting the assessor's perception of how extensively the organizational process or system is deployed.

An apparatus of an embodiment of the invention may be adapted to inhibit display of subsequent questions until the evidence is identified or until the assessor changes the first numerical input to have a second predetermined characteristic in relation to the first value.

An apparatus of an embodiment of the invention may be adapted, and may include equipment and/or devices, to perform the above-described methods.

IV. SUMMARY OF THE DRAWINGS

FIGS. 5A–5E depict a series of "sliding bar" displays.

III. DETAILED DESCRIPTION OF THE INVENTION

Figure 1:
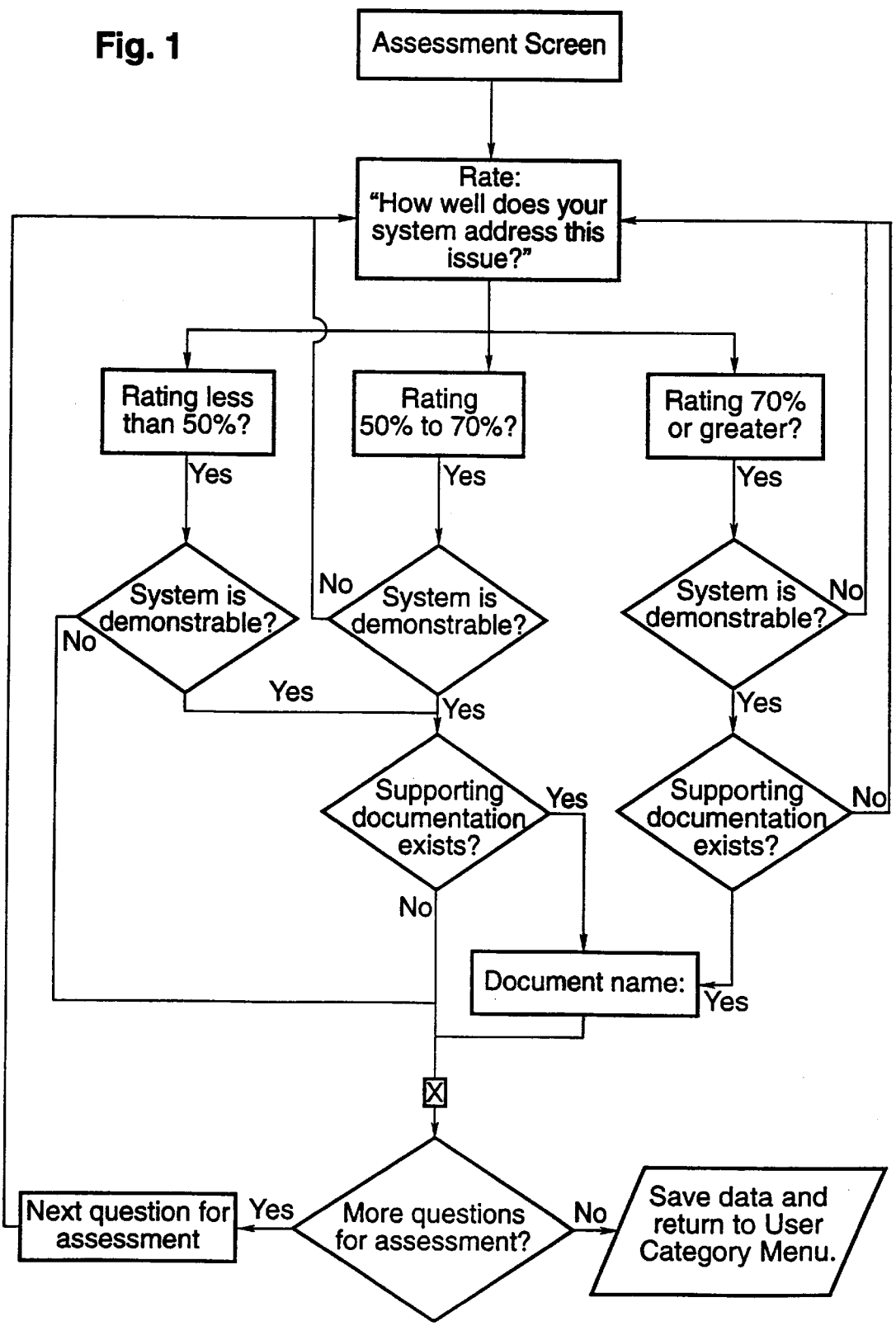
FIG. 1 depicts an apparatus wherein an assessor is prompted to input a numerical input reflective of how well a system addresses an issue.

One embodiment of the invention involves displaying on a display device computer driven questions. The display device may be a computer screen. The computer may typically be an IBM or Apple compatible computer such as a Sytech 486/66 or an Dell 433S/NP. The computer may be connected to a display device such as a Sony Multiscan 17se or a NEC MultiSync 3FGe computer screen.

At least some of the computer driven questions are adapted to prompt an assessor to numerically input on an input device of a computer system the assessor's perception of the capability of the organizational process or system to address an issue. Typically the assessor has at least some knowledge about the organizational process or system. The input device of the computer may be a keyboard, a mouse, or a touch screen. In some instances the input device may include a speech recognition device that converts spoken words into machine-readable inputs.

The method further involves receiving a first numerical input from the input device of the computer system. The first numerical input is stored in the memory of the computer, and the first numerical input reflects the assessor's perception of the capability of the organizational process or system to address an issue.

Once the first numerical input is received, preferably it is compared within a processing of the computer to a first value. If the first numerical input has a first predetermined characteristic in relation to the first value (e.g., the first numerical input is greater than the first value) then the method may involve prompting the assessor to identify evidence that supports the first numerical input. If the evidence is identified by the assessor that supports the first numerical input, then the method may involve validating the first numerical input for subsequent evaluation. If evidence is not identified that supports the first numerical input, then the method may involve inhibiting validation of the first numerical input until the evidence is identified or until the first numerical input is changed to have a second predetermined characteristic in relationship to the first value.

The comparison and validation methods outlined above have the effect of "filtering" data to remove unsupported, biased, erroneous, or exaggerated data. For instance, an assessor may be prevented from entering a favorable rating that is, e.g., above the first value, if the assessor cannot identify evidence to support that favorable of a rating.

In a preferred embodiment the first numerical input may be on a 0–100% scale, a 1–3 scale, a 0–3 scale, a 1–5 scale, a 1–10 scale, or a 1–100 scale. This scale may be a sliding bar scale. For instance, the display device may display the following "issue" presented in the form of a statement:

Responsibilities and authorities for all personnel affecting quality are clearly defined and documented.

At this point the assessor may be asked "How well does your process (or system) address this issue?" The assessor may then input on a sliding scale of the computer (e.g., typically using arrow keys on a computer keyboard) his or her perception of how well the organizational process (or system) addresses the above-referenced issue.

To illustrate, in one example the assessor might enter in a value of 65%, with 100% being the best evaluation and 0% being the worst evaluation. In such example, the first value may be, for example, 50%, and the first predetermined characteristic may be defined to mean that the first numerical input is greater than the first value. In this example, since the first numerical input (65%) is greater than the first value (50%), the first numerical input meets the first predetermined characteristic, and therefore the assessor may then be prompted to identify evidence that supports the first numerical input. Such "evidence" may be in various forms. For instance, it may be visible evidence that is simply affirmed by the assessor. In other embodiments it may be documentary evidence that is identified by name by the assessor.

In one embodiment the "evidence" may by affirmed by the assessor if the assessor indicates that the process or system is demonstrable (i.e., can be demonstrated). If the process or system is demonstrable, then the first numerical input may be validated for subsequent evaluation. If the system or process is not demonstrable, then validation of the first numerical input may be inhibited until the assessor indicates that the system or process is demonstrable or until the assessor changes the first numerical input to have a second predetermined characteristic in relationship to the first value. In this context "validation" means that the numerical input is accepted by or into the computer for future evaluation.

In some embodiments, if evidence is not identified that supports the first numerical input, then the display of subsequent questions may be inhibited until the evidence is identified or until the first numerical input is changed to have the second predetermined characteristic in relation to the first value.

In an embodiment of the invention the "second predetermined characteristic" may be defined to mean that the first numerical input is less than the first value. In the example given above, if the first value is 50% and the assessor indicates that the first numerical input is 65%, then the assessor may be asked to indicate that the process or system is demonstrable. If the assessor does so, then validation and/or display of subsequent questions proceeds. If the assessor does not, then validation may be inhibited, and/or the display of subsequent questions may be inhibited, until the assessor indicates that the process or system is demonstrable, or until the assessor changes the first numerical input to be below 50% (e.g., 45%).

In an embodiment of the invention further computer driven questions may be displayed on the display device. These computer driven questions may be adapted to prompt the assessor to numerical input a second numerical input on the input device of the computer. The second numerical input may reflect the assessor's perception of how extensively the organizational process or system is deployed (i.e., how extensively the organizational process or system is actually used). For instance, after the first numerical input is validated, the assessor may be asked to indicate how well the process being assessed is deployed. At this point the assessor may again answer a numerical value (e.g., a percentage value on a 0–100 scale) that is indicative of how well the system or process is deployed. The term "how extensively the organizational process or system is deployed" refers to an assessment of how extensively processes or systems are actually deployed versus theoretically deployed.

The capability of organizational process or system to address an issue refers to an assessment as to the ability of the theoretical organizational process or system to address an issue. In other words, the first numerical input reflects an assessment as to whether the organizational process or system can address an issue. The second numerical input then reflects how extensively the organizational process or system is actually deployed to address that issue. In other words, does the assessed process or system actually operate or does it sit on the shelf and/or only theoretically operate? For instance, a process or system may have a high (e.g., 90%) first numerical input indicating that the process or system has a favorable ability to address the issue, but the second numerical input may relatively low (e.g., 30%), indicating that process or system is not widely deployed.

Superior results have been achieved by prompting these questions together in conjunction with filtering techniques (see, e.g. Table 2 and accompanying text below). The results are achievable because an apparatus adapted to prompt these combination of questions in conjunction with filtering techniques can address the following two phenomena frequently encountered when assessing a process or system: (1) a process or system is not supported by evidence but the users nevertheless use this process or system, or (2) the process or system is supported by evidence but it is not used. If either of these phenomena are present, then the first numerical input relating to the assessed process or system may be dependant on knowledge embedded within workers. These workers, however, may quit, retire, be promoted, or otherwise cease performing, all without "passing on" the knowledge which enabled the assessed process or system to achieve the first numerical input. Thus the stability of the first numerical input is questionable if either of these two phenomena are present.

The filtering techniques provide information concerning the first phenomenon. As described above, these filtering techniques also tend to inhibit favorable first numerical inputs that are unsupported. Thus these filtering techniques also increase the accuracy of the first numerical input if the first phenomenon is present. The second numerical input provides information concerning the second phenomenon. This information can be used with the first numerical input in subsequent evaluations (e.g., by multiplying the first numerical input by the second numerical input to obtain a combined input value). Thus an apparatus adapted to prompt the first and second numerical inputs, in combination with the filtering techniques, has the effect of providing information about, and/or increasing the accuracy of, the first numerical input. The above-described information that is provided "about the first numerical input" is often reflective of the stability of the first numerical input.

In the above-described manner an assessor may be prompted to provided filtered numerical inputs that can together be used to evaluate the process or system. For instance, the first numerical input may be multiplied by the second numerical input (e.g., 90%×30%=27%) to provide a multiplied evaluation factor that combines the characteristics of both inputs. Alternately the plurality of first numerical inputs from various assessors may be used, and one or more standard deviations for the first and second numerical inputs may be calculated and compared or used in combination with each other for evaluation purposes. A wide variety of issues may be surveyed by a wide variety of assessors. Table 1 depicts issues that may be presented:

TABLE 1

4.1 MANAGEMENT RESPONSIBILITY

| | |
|---|---|
| 1. | Quality policy is communicated, understood and maintained throughout the organization. (1.4.1.1) |
| 3. | Responsibilities and authorities for all personnel affecting quality are clearly defined and documented. (1.4.1.2) |
| 3.1 | Authority delegated to personnel to prevent nonconformity reoccurrence. (1.4.1.2) |
| 3.2 | Authority delegated to personnel to identify & record quality problems. (1.4.1.2) |
| 3.3 | Authority delegated to personnel to initiate & verify corrective action. (1.4.1.2) |
| 3.4 | Authority delegated to personnel to control further processing. (1.4.1.2) |
| 4. | A multi-disciplinary approach is used in the design process with direct input in decision making. (1.4.1.2) |
| 5. | Periodic top management review of quality system effectiveness is supported by appropriate records. (1.4.1.3) |
| 6. | Qualified technical personnel are available for design, process, product and service support. (1.4.1.2.2) |
| 7. | Management representative with authority & responsibility to ensure standards compliance (i.e. ISO-9000, QS-9000, NQA, etc.) is clearly defined. (1.4.1.2.3.) |
| 8.1 | Documented business plan(s) consider standard's requirements (i.e. ISO-9000, QS-9000, NQA, etc.) including competitive |

TABLE 1-continued

| | |
|---|---|
| | product analysis. (as applicable) (1.4.1.4) |
| 8.2 | Documented business plans(s) considers the standard's requirements (i.e. ISO-9000, QS-9000, NQA, etc.) and benchmarking. (as applicable) (1.4.1.4.) |
| 8.3 | Documented business plans(s) considers standard's requirements (i.e. ISO-9000, QS-9000, NQA, etc.) and R & D plans. (as applicable) (1.4.1.4) |
| 8.4 | Documented business plans(s) considers standard's requirements (i.e. ISO-9000, QS-9000, NQA, etc.) of internal quality and operational performance measures (as applicable) (1.4.1.4) |
| 9. | Data is used to focus on competitors and/or appropriate benchmarks for improving quality, productivity, and operation efficiency. (1.4.1.5) |
| 10. | Documented and objective processes are used to measure customer satisfaction. (e.g.: a plan with short and long term actions addressing customer dissatisfaction factors.) (1.4.1.6) |
| 11. | Cross-functional teams are used for the quality planning process. (1.5.2.1) |

4.2 QUALITY SYSTEM

| | |
|---|---|
| 1. | Quality Manual adequately meets QS-9000 requirements for documentation of a comprehensive quality system. |
| 2.1 | Quality planning process is consistent with the elements of the quality system that addresses Product Program plan preparation. (1.5.2.3) |
| 2.2 | Quality planning process is consistent with the elements of the quality system that addresses identification and acquisition of the appropriate resources. (1.5.2.3) |
| 2.3 | Quality planning process is consistent with the elements of the quality system and addresses conducting design and process compatibility studies. (1.5.2.3) |
| 2.4 | Quality planning process is consistent with the elements of the quality system and addresses updating and maintenance of all quality control and inspection methodology (1.5.2.3) |
| 2.5 | Quality planning process is consistent with the elements of the quality system and addresses identification of suitable verification at appropriate stages. (1.5.2.3) |
| 2.6 | Quality planning process is consistent with the elements of the quality system and addresses preparation of control plans and F FMEAs. (1.5.2.3) |
| 2.7 | Quality planning process is consistent with the elements of the quality system and addresses review of standards and specifications. (1.4.2.3) |
| 3. | Feasibility reviews are conducted to confirm the compatibility of design with the manufacturing process, including capacity planning and utilization. (1.5.2.3) |
| 4. | Engineering requirements are met at the required statistical process capability. (1.4.2.3) |
| 5. | Control plans are developed to the subsystem, component, and/or material level. (1.4.2.3) |
| 6. | Control plans include all special characteristics, related process and parameters - and are identified as such. (1.4.2.3) |
| 7. | Control plans are revised when appropriate for product and process changes or when processes are found to be unstable or non-capable. (1.4.2.3) |
| 8. | Control plans cover three phases: prototype, pre-launch, production (unless exempted by the customer). (1.4.2.3) |
| 9. | Process FMEAs consider all special characteristics. (1.4.2.3) |
| 10. | Adequate supporting procedures exist for each element of the quality manual. (4.2.2) |
| 11. | Special characteristics have been identified and included in the Control Plan(s). (1.4.2.3.a) |
| 12. | A comprehensive quality system (appropriate to the product or service produced) is established and implemented. (4.2.1) |

4.3 CONTRACT REVIEW

| | |
|---|---|
| 1. | Contract review activities are adequately documented and maintained to ensure that order requirements are understood and are within the supplier's capability prior to order acceptance. (1.4.2.3) |
| 2. | Standard's requirements (i.e. ISO-9000, QS-9000, NQA, etc.) and customer contract requirements are deployed into the quality system. (1.4.3.2.) |
| 3. | Provisions to document and deploy contract changes throughout the organization exist. (1.4.3.3) |
| 4. | Contract review records are maintained. (1.4.3.4) |

4.4 DESIGN CONTROL

| | |
|---|---|
| 1. | Design plans for each project have been established and responsibility assigned. (1.4.4.2) |
| 2. | Responsible personnel are experienced in the "required skills" or appropriate equivalents. (1.4.4.2) |
| 3. | Applicable statutory and regulatory requirements are identified. (1.4.4.4) |
| 4.1 | Appropriate resources and facilities are available to use computer aided design, engineering and analysis. (1.4.4.4) |
| 4.2 | Technical leadership is provided when CAD/CAE is sub-contracted. (1.4.4.4) |
| 5. | Formal documented design reviews are conducted per the design plan. (1.4.4.5) |
| 6. | Design output is documented and expressed as requirements that can be verified. (1.4.4.6) |
| 7.1 | Design output meets design input requirements. (1.4.4.6) |
| 7.2 | Design output contains or references acceptance criteria. (1.4.4.6) |
| 7.3 | Design output includes a review of design output documents before release. (1.4.4.6) |
| 8.1 | Design outputs are the result of a process that used the "Design Techniques" or alternatives (1.4.4.2) & (1.4.4.6) |
| 8.2 | Design outputs are the result of a process that used Geometric Dimensioning and Tolerancing (GDT). (1.4.4.6) |
| 8.3 | Design outputs are the result of a process that used analysis of cost/performance/risk trade-offs. (1.4.4.6) |
| 8.4 | Design outputs are the result of a process that used feedback from testing, production and the field. (1.4.4.6) |
| 8.5 | Design outputs are the result of a process that used analysis of design failure mode and effects (DFMEA). (1.4.4.6) |
| 9. | Performance testing (life, durability, reliability) is tracked for timely completion and conformance. (1.4.4.7) |
| 10. | A comprehensive prototype program exists (unless waived by the customer or made unnecessary by the generic nature of the product supplied). (1.4.4.7) |
| 11. | Design validation has been performed at the specified frequencies, results recorded, and failures addressed. (1.4.4.8) |
| 12. | Design changes are documented and approved by authorized personnel before implementation. (1.4.4.9) |
| 13. | Written customer approval or waiver has been obtained prior to a design change being implemented into production. (1.4.4.9) |

4.5 DOCUMENT AND DATA CONTROL

| | |
|---|---|
| 1. | New and revised documents are reviewed and approved by authorized personnel prior to issue. (1.4.5.2) |
| 2. | A master list (or equivalent) identifies document revision status. (1.4.5.2) |
| 3. | Timely review, distribution and implementation of customer engineering standards, specifications and changes. (1.4.5.2) |
| 4. | All referenced documents are available on-site. (1.4.5.1) |
| 5. | Special characteristic symbols or notations are shown on process control plans and similar documents. (1.4.5.1) |
| 6. | Where documents or data is retained on software, appropriate controls are maintained for changes. (1.4.5.1 & 3) |

4.6 PURCHASING

| | |
|---|---|
| 1. | Subcontractors are evaluated and selected based on their ability to meet quality system and quality assurance requirements. (1.4.6.2.a) |
| 2. | Appropriate level of control over subcontractors is maintained. (1.4.6.2.b) |
| 3. | Quality records of subcontractors are kept up to date and used to evaluate performance. (1.4.6.2.c) |
| 4. | Subcontractor development is conducted using the standard's requirements (i.e. ISO-9000, QSR (Sections I & II), NQA, etc.) as the fundamental quality system requirement. (1.4.6.2) |
| 5. | Purchasing documents contain data that clearly describe the product or service being ordered. (1.4.6.3) |
| 6. | Where applicable, there is provision for the customer (or representative) to verify subcontractor quality on the subcontractor's premises. (1.4.6.2) |

4.7 CONTROL OF CUSTOMER SUPPLIED PRODUCT

| | |
|---|---|
| 1. | Material is examined upon receipt to check quantity, identity, and transit damage. (1.4.7) |
| 2. | Material is periodically inspected to detect signs of deterioration, proper conditions & storage time limitations. (1.4.7) |
| 3. | For product that is lost, damaged or otherwise unsuitable for use, records are maintained and reports provided to the customer. |

TABLE 1-continued (1.4.7)
4.8 PRODUCT IDENTIFICATION AND TRACEABILITY

1. Product is identified, where appropriate, at all production stages? (1.4.8)
2. Traceability is maintained and recorded when required by the customer? (1.4.8)

4.9 PROCESS CONTROL 1.1 Documented job instructions have been developed and are accessible at each work station. (1.4.9)
1.2 Documented job instructions communicate requirements to all employees involved. (1.4.9)
1.3 Documented job instructions provide for verification of job set-ups and tool change intervals. (1.4.9)
1.4 Documented job instructions specify monitoring of special characteristics. (1.4.9)
1.5 Documented job instructions list requirements for inspection, testing, gaging and recording results. (1.4.9)
1.6 Documented job instructions provide sample size and frequency. (1.4.9)
1.7 Documented job instructions establish approval and rejection criteria. (1.4.9)
1.8 Documented job instructions list required tools and gages (with mastering at required frequency). (1.4.9)
1.9 Documented job instructions describe the identification and handling of non-conforming material. (1.4.9)
1.10 Documented job instructions specify appropriate notifications and corrective actions (including plans for unstable/non-capable processes). (1.4.9)
1.11 Documented job instructions specify application of statistical methods required by control plans. (1.4.9)
1.12 Documented job instructions identify relevant engineering and manufacturing standards and the latest engineering change affecting the instruction. (1.4.9)
1.13 Documented job instructions display appropriate approvals and dates. (1.4.9)
1.14 Documented job instructions display operation name and number. (1.4.9)
1.15 Documented job instructions are keyed to process flow charts. (1.4.9)
1.16 Documented job instructions show part name and number. (1.4.9)
1.17 Documented job instructions show revision date for instructions. (1.4.9)
1.18 Documented job instructions define visual controls. (1.4.9)
2. Employees perform operations/inspections according to documented instructions.
3.1 Process control requirements are met.
3.2 The customer's preliminary process capability requirements are met. (1.4.9.2)
3.3 The customer's ongoing process performance requirements are met. (1.4.9.3)
3.4 Special causes of variation are investigated and appropriate actions taken. (1.4.9.3)
3.5 Control charts are annotated with significant process events. (1.4.9.3)
3.6 Control charts are maintained and reviewed with highest priority given to special characteristics. (1.4.9.3)
4.1 Planned preventive maintenance system includes a maintenance schedule established with specific responsibilities assigned. (1.4.9.g)
4.2 Planned preventive maintenance system is evaluated for process capability improvement. (1.4.9.g)
4.3 Planned preventive maintenance system is evaluated for reduction of machine/process downtime. (1.4.9.g)
4.4 Maintenance is conducted at the prescribed frequencies for all equipment. (1.4.9.g)
4.5 Planned preventive maintenance system tracks availability of replacement parts for key manufacturing equipment. (1.4.9.g)
4.6 Planned preventive maintenance system uses predictive maintenance methods. (1.4.9.g)
5. A process exists to identify all applicable government safety and environmental regulations, including those concerning handling, recycling, eliminating, or disposing of hazardous materials. (1.4.9.b)
6. Possession of appropriate governmental certificates indicating compliance to the identified applicable regulations. (1.4.9.b)
7. Work environment is clean and well-organized. (1.4.9.b)
8.1 Evaluation areas for "appearance items" have appropriate lighting.
8.2 Appropriate masters of "appearance items" are available.
8.3 "Appearance Item" masters and evaluation equipment are adequately maintained.
8.4 Verification exists that personnel making appearance evaluation are qualified to do so.

4.10 INSPECTION AND TESTING 1.1 Purchased material is controlled and verified per the selected system prior to release to production. (1.4.10.2)
1.2 Positive identification is provided for material used in production but not verified. (1.4.10.2)
1.3 Where specified as the control method, suppliers submit statistical data. (1.4.10.2)
2.1 Product is inspected and tested as required by the documented procedures. 1.4.10.3)
2.2 Product is held until the required inspections and tests have been completed. (1.4.10.3)
2.3 Defect prevention methods, such as statistical process control, error proofing, visual controls, is used rather than defect detection. (1.4.10.3)
3.1 Final inspection and testing is conducted in accordance with documented procedures. (1.4.10.4)
3.2 Final inspection and testing ensures no product is shipped until all activities specified in the documented procedures have been satisfactorily completed. (1.4.10.4)
4. Accredited laboratory facilities are used when required by the customer. (1.4.10.1,II.1)
5.1 Layout inspection is conducted per the Control Plan. (1.4.10.4)
5.2 Functional testing is conducted per Control Plan. (1.4.10.4)
6. Appropriate records are maintained for all inspections and tests. (1.4.10.5)

4.11 INSPECTION, MEASURING, AND TEST EQUIPMENT

1. Inspection, measuring, and test equipment (including software when appropriate) has been provided that is capable of the required accuracy and precision. (1.4.11.2.a)
2. Required accuracy/precision of inspection, measuring, and test equipment is determined. (1.4.11.2.a)
3. Measurement system analysis is conducted (Gage R & R) for all gages, measuring, and test equipment, noted on the control plan. (1.4.11.4)
4. Appropriate criteria (per the <u>Measurement Systems Analysis Manual</u>) is used for acceptance of measuring equipment. (1.4.11.4)
5. Where test software, hardware, or comparative references are used, capability and stability are verified prior to use (linearity and accuracy as appropriate). (1.4.11.2)
6. Each item of inspection, measurement, and test equipment is identified with a unique designation (including employee-owned equipment)? (1.4.11.3)
7. Each piece of inspection, measurement, and test equipment is calibrated at prescribed intervals and in the correct environment (including employee-owned equipment). (1.4.11.2.b)
8. Gage condition and actual readings are recorded prior to recalibration. (1.4.11.2e)
9. Appropriate actions, including customer notification, are taken on product and process when inspection, measurement, or test equipment is found to be out of calibration. (1.4.11.2.f)
10. Inspection, measurement, and test equipment are properly handled, preserved, and stored to maintain calibration and fitness for use. (1.4.11.2.h)
11. Inspection, measurement, and test facilities (including software when applicable) are safeguarded to insure that calibration is not disturbed. (1.4.11.2.i)
12. Records exist for recalibration of part-specific gages, etc. following engineering changes. (1.4.11.2)

4.12 INSPECTION AND TEST STATUS

1. Inspection and/or test status is suitably identified throughout the production process. (1.4.12.1)
2. If required by the customer, additional verification requirements are met for launching of new products. (1.4.12.2)

4.13 CONTROL OF NONCONFORMING PRODUCTS

1. Systems ensure identification, documentation, segregation (where possible) to a designated area, and disposition of nonconforming and suspect product. (1.4.13.1)

TABLE 1-continued

| | |
|---|---|
| 2. | Responsibilities for review and disposition of nonconforming and suspect product are clearly defined. (1.4.13.2) |
| 3. | Nonconforming and suspect products are reviewed according to defined procedures. (1.4.13.2) |
| 4.1 | Systems ensure nonconforming and suspect parts are reviewed to specified requirements. (1.4.13.2) |
| 4.2 | Systems ensure nonconforming and suspect parts are accepted with customer-approved concessions (EAPAs). (1.4.13.2) |
| 4.3 | Systems ensure nonconforming and suspect parts are reworked to approved repair standards. (1.4.13.2) |
| 4.4 | Systems ensure nonconforming and suspect parts are regraded for alternative applications. (1.4.13.2) |
| 4.5 | Systems ensure nonconforming and suspect parts are rejected or scrapped. (1.4.13.2) |
| 5. | Processes assure that only material that has passed inspections and/or tests can be provided to the customer. (1.4.13.2) |
| 6. | Nonconformances are recorded to permit defect analysis. (1.4.13.3) |
| 7. | Reworked products are reinspected and/or tested according to the Control Plan. (1.4.13.2) |
| 8. | Repair/rework instructions are accessible and utilized by the appropriate personnel. (1.4.13.3) |
| 9. | Where applicable, approvals are obtained for products supplied for service applications that may have visible rework. (1.4.13.3) |
| 10. | Systems ensure that customer authorization is received prior to shipping nonconforming material. (1.4.13.4) |
| 11. | Records are maintained of the expiration dates for engineering approved product authorizations (EAPAs) and quantities authorized. (1.4.13.4) |

4.14 CORRECTIVE AND PREVENTIVE ACTION

| | |
|---|---|
| 1. | Appropriate corrective actions are developed to eliminate causes of nonconformances? (1.4.14.2.c) |
| 2. | Disciplined problem solving methods are used. (1.4.14.1) |
| 3. | Customer complaints and reports of nonconformances are effectively handled. (1.4.14.2.a) |
| 4. | Causes of nonconformances are investigated and the results documented. (1.4.14.2b) |
| 5. | Effectiveness of corrective action is verified. (1.4.14.2.d) |
| 6. | Returned parts from customer's locations are analyzed and corrective actions are initiated. (1.4.14.2) |
| 7. | Nonconformance reports, (e.g. product quality, deviation, audit result, quality records, etc.) are used to develop preventive actions. (1.4.14.3.a) |
| 8. | Relevant information on actions taken including changes to procedure are submitted for management review. (1.4.14.3.d) |

4.15 HANDLING, STORAGE, PACKAGING, PRESERVATION AND DELIVERY

| | |
|---|---|
| 1. | Material handling methods prevent product damage and deterioration. (1.4.15.2) |
| 2. | Storage areas are appropriate for preventing damage or deterioration of the product. (1.4.15.3) |
| 3. | When required by the nature of the product, the condition of product in stock is checked at intervals to detect deterioration. (1.4.15.3) |
| 4. | Systems control the packing, packaging, and marking processes to the extent necessary to ensure product conformance to specifications. (1.4.15.4) |
| 5. | Applicable customer packaging standards are available. (1.4.15.4) |
| 6. | Compliance to applicable customer packaging standards. (1.4.15.4) |
| 7. | Appropriate methods are used for product preservation and segregation. (1.4.15.5) |
| 8. | Systems ensure the protection of product quality during delivery to the destination. (1.4.15.6) |
| 9. | Appropriate analyses and corrective actions are used when scheduled delivery performance is not 100%. (1.4.15.6) |
| 10. | Inventory management system optimizes inventory turns and stock rotation. (1.4.15.6) |

4.16 CONTROL OF QUALITY RECORDS

| | |
|---|---|
| 1. | Records show effective operation of the quality system, including pertinent sub-contractor quality records. (1.4.16) |
| 2. | Quality records are legible and readily retrievable. (1.4.16) |
| 3. | Quality records (hardcopy or electronic) are stored in a suitable environment to prevent deterioration, damage, or loss. (1.4.16) |
| 4.1 | Quality records are retained per established procedures. (1.4.16) |

TABLE 1-continued

| | |
|---|---|
| 4.2 | Quality records include production part approval, control charts, internal quality audits, and failure mode and effects analysis (FMEAs). (1,4,16) |
| 5. | Quality records are available to the customer. (1.4.16) |
| 6. | Systems ensure retention control and timely disposal of quality records. (1.4.16) |

4.17 INTERNAL QUALITY AUDITS

| | |
|---|---|
| 1. | Internal quality system audits are conducted as planned. (1.4.17) |
| 2. | Personnel conducting the audit are independent of the function being audited. (1.4.17) |
| 3. | Audits are scheduled on the basis of the status and importance of the activity. (1.4.17) |
| 4. | Audit results are documented and brought to the attention of the responsible personnel. (1.4.17) |
| 5. | Corrective actions are timely, recorded, and evaluated for effectiveness. (1.4.17) |
| 6. | Audits include work environment and general housekeeping. (1.4.17) |

4.18 TRAINING

| | |
|---|---|
| 1. | Training needs for all personnel performing activities affecting quality are met. (1.3.18) |
| 2. | Qualifications for jobs affecting quality include identification of appropriate education, training needs, and experience. (1.4.18) |
| 3. | Training records are maintained. (1.4.18) |
| 4. | Training effectiveness is periodically evaluated. (1.4.18) |

4.19 SERVICING

| | |
|---|---|
| 1. | Servicing meets the specified requirements. (1.4.19) |
| 2. | Reporting and verification systems are established to communicate data from serving functions to supplier manufacturing, engineering and design activities. (1.4.19) |

4.20 STATISTICAL TECHNIQUES

| | |
|---|---|
| 1. | Need of statistical techniques for establishing, controlling, and verifying the capability of process parameters and product characteristics has been identified. (1.4.20.1) |
| 2. | Procedures are established and maintained to implement and control the application of statistical techniques. (1.4.20.2) |
| 3. | Advanced quality planning is used to determine the appropriate statistical techniques. (1.4.20.2) |
| 4. | Concepts of variation, control (stability), capability, and over-control are understood throughout the organization. (1.4.20.2) |

II.1 PRODUCTION PART APPROVAL PROCESS

| | |
|---|---|
| 1. | Complete supporting data exists for all production part approval submissions. |
| 2. | Supporting data shows conformance to all customer requirements, including change notification. (1.4.9.6,II.1) |
| 3. | Supporting data is organized and filed together for each part. |
| 4. | Materials are purchased from customer approved subcontractor list. (1.4.6.1) |

II.2 CONTINUOUS IMPROVEMENT

| | |
|---|---|
| 1. | Continuous quality and productivity improvement efforts are a key element of the company's business. |
| 2. | Specific improvement projects have been identified. |
| 3. | Appropriate measurables are identified for improvement projects. |
| 4. | Evidence of improvement in project measurables exists over relevant time periods (from six months to five years) |

II.3 MANUFACTURING CAPABILITIES

| | |
|---|---|
| 1. | Cross-functional teams are used for facilities, equipment, and process planning in conjunction with the advanced quality planning process. |
| 2. | Plant layout minimizes material travel and handling, facilitating synchronous material flow, and maximizing value added use of floor space. |
| 3. | Mistake proofing techniques are utilized where appropriate. |
| 4. | Resources are available for tool and gage design (if subcontracted, rate the tracking and follow-up system). |
| 5. | Resources are available for tool and gage fabrication (if subcontracted, rate the tracking and follow-up system). |
| 6. | Resources are available for complete tool and gage dimensional inspection (if subcontracted, rate the tracking and follow-up system). |
| 7. | Resources are available for tool and gage maintenance and repair (if subcontracted, rate the tracking and follow-up system). |

Results may then be evaluated to determine problem areas that might warrant on-site investigation. For instance, if 100 different issues were assessed by 10 different assessors, the average multiplied evaluation factor might be 55%, with only 8 issues being below 45%. On-site evaluation teams might then be directed to focus their efforts on investigating the 8 issues that were below 45% instead of all 100 issues, thereby saving manpower and expense. Alternately, the on-site teams could be directed to investigate issues that had standard deviations above a certain value (e.g., 8%). Again, the efforts of the on-site team would be focused and reduced, thereby saving manpower and expense.

Information or data collected may be further driven or sent to a printer or data collection device such as a memory in a computer. Further evaluation may be achieved by having one computer or control system automatically interact with another, wherein the second computer or control system is requested to gather or retrieve further data for validation or evaluation purposes. For instance, the second computer or control system may be adapted to provide information that verifies or confirms that numerical inputs are reasonably accurate.

FIG. 1 demonstrates an embodiment of the invention which includes an assessment screen adapted to display a question in the form or a statement or issue. For the purposes of this patent it is to be understood that a "question" may be presented in multiple ways. For instance, a question may be a standard "yes/no" or "true/false" binary answer form (e.g., Does the ABC system maintain on-time performance records?). In addition, the question may be presented by making a statement, or stating an issue, and then asking the assessor to evaluate the statement or issue on a numerical scale. For instance, the assessor may be presented with the statement that "the ABC system maintains on-time performance records." In response thereto, the assessor may enter a value on an analog scale reflecting the accuracy of the statement (e.g., 6 on a 1–10 scale, with 10 being the most favorable rating).

In FIG. 1 a series of statements or issues (such as those depicted in Table 1) are shown on the assessment screen. The following question is then displayed:

"How well does your system address this issue?"

At this point, the assessor is prompted to input a numerical input, on an analog percentage scale, which reflects how well the assessed system addresses the issue. As shown by the arrows in FIG. 1, if the rating is less than 50%, then the assessor may be asked if the system is demonstrable. If the answer is "no," then additional displays may be shown as represented by Box X in FIG. 1. If more questions are scheduled to be presented to the assessor, then the process or apparatus may proceed to the next question for assessment. If no more questions are scheduled, then the data may be saved and the assessor may be returned to a user category menu.

To illustrate, in FIG. 1, the apparatus may be adapted such that the first value is 50% and the first characteristic in relationship to the first value is whether the first numerical input (i.e., the initial rating) is greater than 50%. The second characteristic in relationship to the first value is whether the first numerical input is less than 50%. The "evidence" is whether the assessed system is demonstrable (i.e., can the system be demonstrated?). Subsequent evidence may be requested in the form of supporting documentation. For instance, if the assessor indicates that the assessed system is demonstrable, then the assessor may be asked to indicate whether supporting documentation exists. If supporting documentation exists, then the assessor may be asked to indicate document names. If supporting documentation does not exist, then the assessor may proceed to Box X.

In FIG. 1, the first numerical input may be compared to other values besides the first value (the first value in this application acts as a trigger point, or set point). For instance, the first numerical input may be compared to determine if it is between 50–70%. If the first numerical input is between 50% and 70%, then the assessor may be asked to indicate whether the system is demonstrable, as shown in FIG. 1. If the system is not demonstrable, then the assessor may be asked to change the rating. In other words, the system shown in FIG. 1 may inhibit display of subsequent questions if evidence (e.g., system demonstrability) is not presented that will support ratings in the range of 50–70%. In FIG. 1, if the first numerical input is between 50–70% and the system is demonstrable, then the assessor is asked further questions as outlined above for FIG. 1 (e.g., if supporting documentation exists, etc.).

The system in FIG. 1 also has the capability of comparing the first numerical input to a third value. As shown in 1, if the first numerical input is 70% or greater, then the assessor is asked to determine if the system is demonstrable. If the system is not demonstrable, then the apparatus inhibits display of subsequent questions until the assessor changes the rating (i.e., lowers the first numerical input below 70%). Furthermore, the assessor is subsequently asked if supporting documentation exists. If the assessor indicates that no supporting documentation exists, then again the display of subsequent questions is inhibited until the assessor indicates that supporting documentation exists or changes the first numerical input to a lesser value.

In FIG. 1, Box X may indicate that the first numerical input is validated. In this context "validation" may simply mean that the first numerical input is stored, that the assessor is not inhibited from proceeding to subsequent questions, and/or that the display of subsequent questions is not inhibited.

The apparatus shown in FIG. 1 has the effect of "filtering" assessment indicia. As shown in FIG. 1, as the rating (i.e., numerical input) becomes more favorable (i.e., higher), then greater levels of evidentiary support are required. If the rating is less than 50%, then the assessor may still proceed to Box X even if the assessed system is not merely demonstrable. Of course, if the assessed system is demonstrable, then information is received by the apparatus, and if the supporting documentation exists, that information is also received by the apparatus. If the first numerical input is between 50–70%, then a greater level of evidence is required before the assessor can proceed to Box X. Specifically, at least system demonstrability must be indicated. Otherwise the assessor must change (i.e., lower) the first numerical input. Again, if supporting documentation exists, the information is received by the apparatus. Finally, if the numerical input is 70% or greater, then system demonstrability and supporting documentation must exist. Otherwise the assessor must change the first numerical input to a lesser value.

In effect, the apparatus shown in FIG. 1 filters the data collected by inhibiting validation/collection of exaggerated, untrue, and/or unsupported numerical inputs. Furthermore, as a numerical input becomes more favorable, then the level of support required for that rating also increases.

The numerical input shown in FIG. 1 may be modified based on a wide variety of factors preferred by the apparatus designers. For instance, in some apparatus lower ratings may be preferred (e.g., a rating system of 1–10, where 1 is the most favorable rating). In such case, appropriate revision of the levels of evidence as correlated to numerical inputs would be required. In some instances numerical inputs may be utilized to indicate specific events or circumstances (e.g., 1=daily, 2=weekly, 3=monthly, 4=yearly, or 1=always, 2=sometimes, 3=never, etc.)

Figure 2:
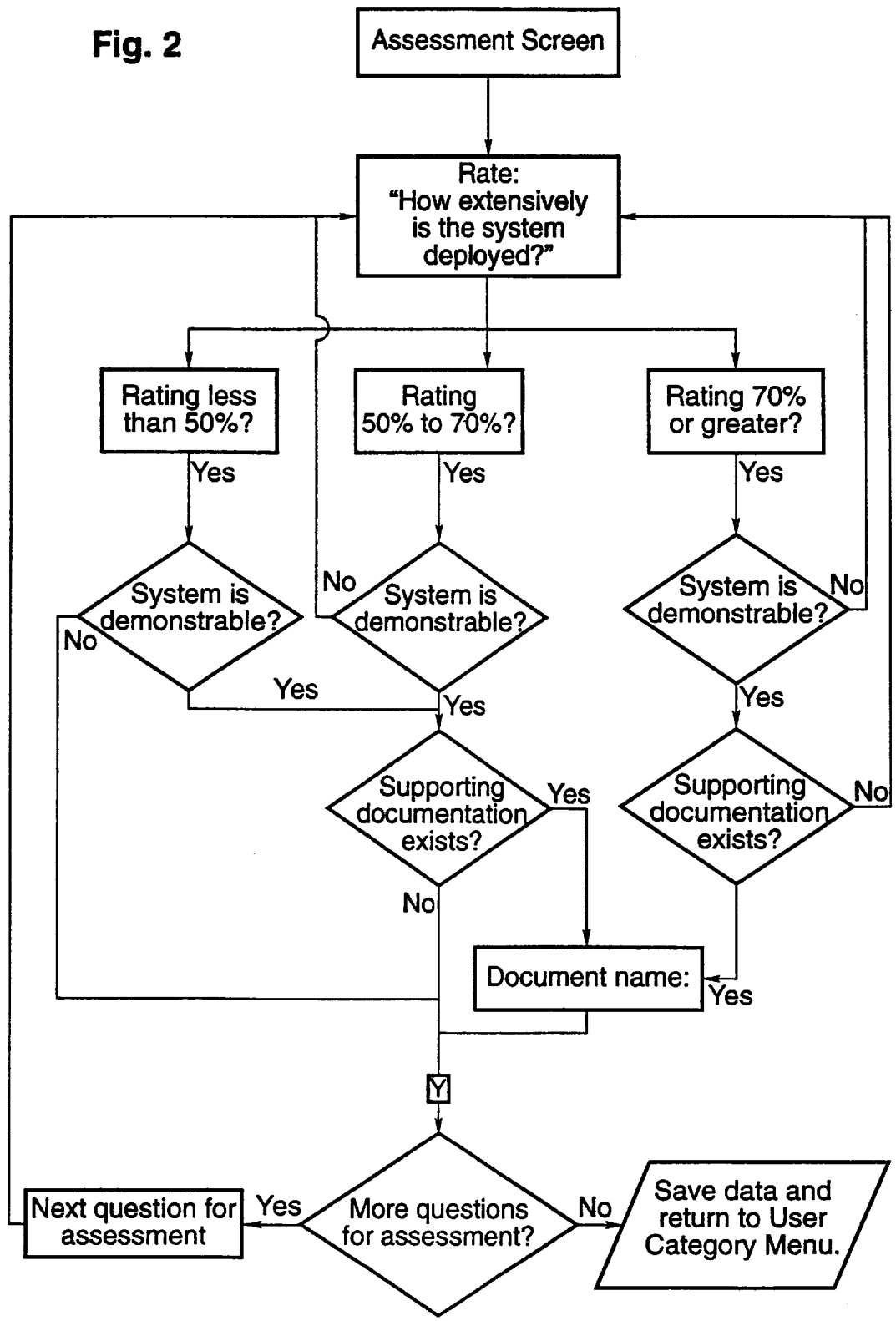
FIG. 2 depicts an apparatus wherein an assessor is prompted to input a numerical input reflective of how extensively a system is deployed.

In FIG. 1, Box X may represent a series of subsequent questions presented to the assessor. For instance, Box X may be represented by the system shown in FIG. 2. In FIG. 2 a question may be displayed on a display device which would ask for a second numerical input reflecting the assessor's perception of how extensively the organizational process or system is deployed. Again, a filtering apparatus may be employed in conjunction with the second numerical input to correlate more favorable ratings with varying levels of evidence. This filtering apparatus may be similar to the FIG. 1 filtering apparatus. Depending on the level of the second numerical input, then varying levels of evidence may be required to arrive at Box Y. Box Y may serve similar purposes as Box X. That is, it may serve to validate the second numerical input, or represent subsequent questions to be displayed to the assessor.

Figure 3:
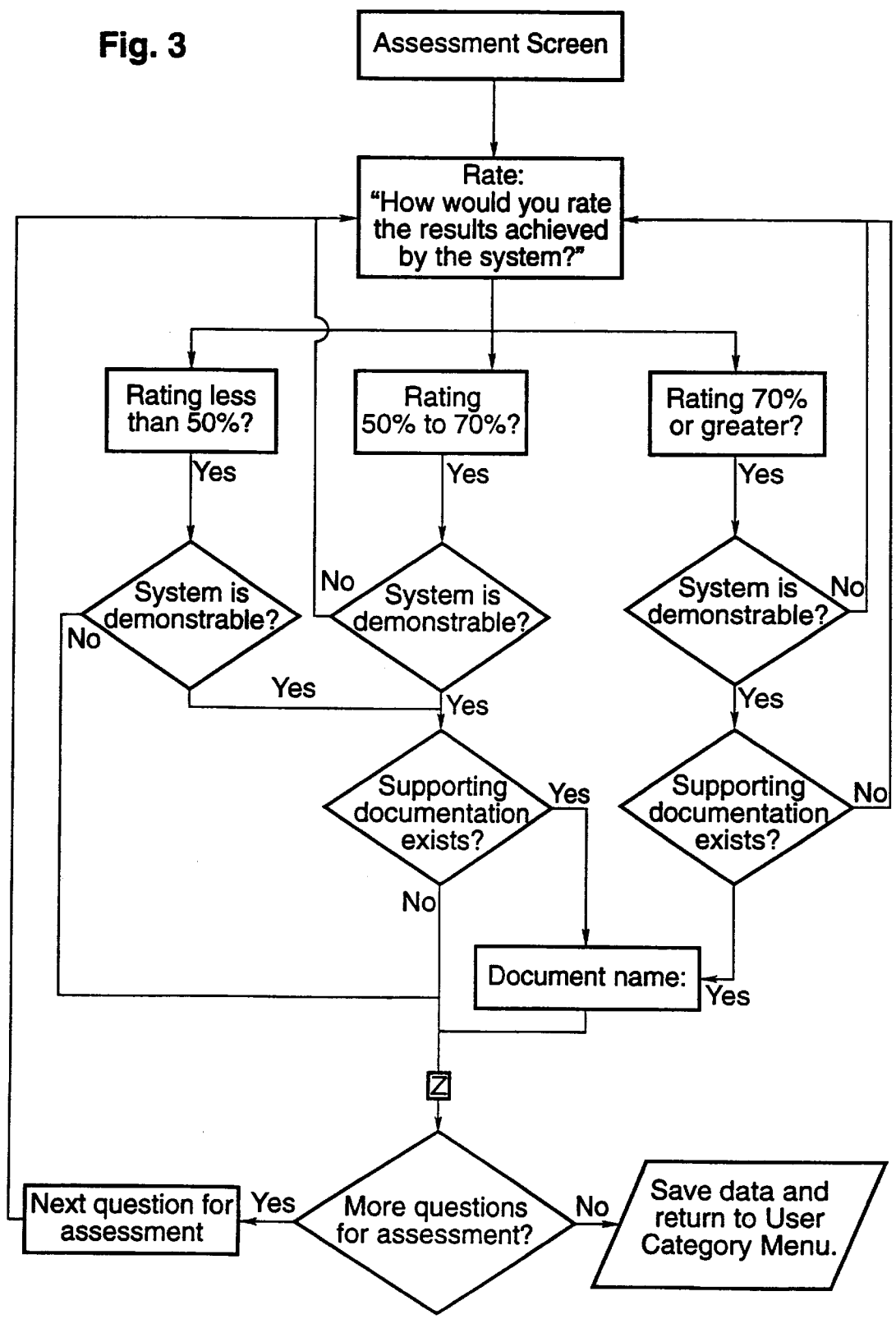
FIG. 3 depicts an apparatus wherein an assessor is prompted to input a numerical input reflective of results achieved by the system.

FIG. 3 depicts a system analogous to that of FIG. 1, except the initial questions is:

"How well would you rate the results achieved by the system?"

In FIG. 3, a third numerical input is input into the system, the third numerical input reflecting the assessor's perception of the results achieved by the organizational process or system. A filtering apparatus similar to the filtering system shown in FIG. 1 may also be employed. Box Z in FIG. 3 may represent subsequent questions to be asked.

Preferred embodiments of the invention may employ the apparatus of FIG. 1 with the apparatus of FIG. 2, the apparatus of FIG. 1 with the apparatus of FIG. 3, the apparatus of FIG. 1 with the apparatus of FIGS. 2 and 3, and the apparatus of FIG. 2 with the apparatus of FIG. 3. Furthermore, the order of the apparatus may be reversed or mixed. For example, questions presented in the apparatus of FIG. 2 may be asked first followed by questions in the apparatus of FIG. 1.

An apparatus of the invention combining FIG. 1 with FIG. 2 may provide superior evaluation results. It is believed that the superior results may be achieved because the apparatus of FIG. 1 provides an assessment as to how well a system may address an issue, however it doesn't provide an assessment on how extensively the system is deployed. Thus a system may work (i.e., address an issue) particularly well (i.e., greater than 90%); however it may only minimally deployed. By using FIG. 1 and FIG. 2, an assessment as to the capability of the system combined with an assessment as to system deployment may be achieved. For instance, if the system addresses the issue particularly well (i.e., at 90%) but is only 60% deployed, then in one embodiment a combined assessment of 90%×60%=54% may be calculated. Such combined assessments may be particularly helpful to focus on-site assessment team efforts.

Figure 4:
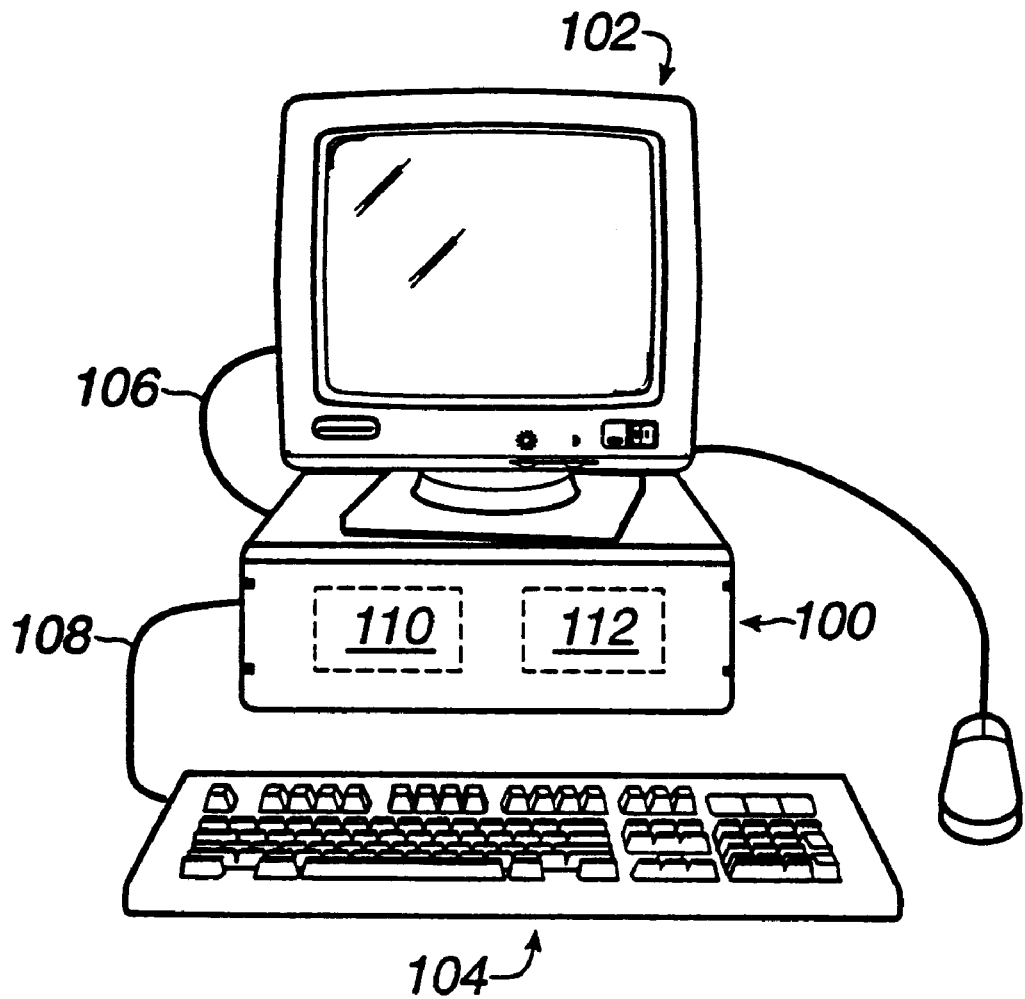
FIG. 4 depicts an apparatus including a computer, a display device, and an input device.

FIG. 4 depicts an apparatus of the invention including a computer 100 connected via line 106 to a display device 102. The computer 100 is also connected via line 108 to an input device 104 (e.g., a keyboard or a mouse). The computer 100 may typically include a memory 110 and a processing unit 112 within it. Additional output devices such as printers may also be connected to the computer 100. The computer 100 may be adapted, using computer software or hardware, to perform the functions outlined in FIGS. 1–3.

Figure 5A:
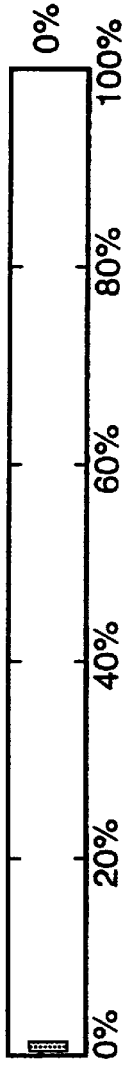
Figure 5B:
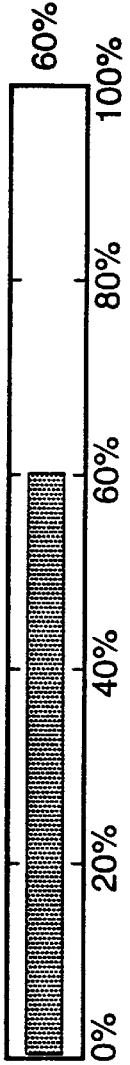

FIGS. 5A–5E depict a series of screen displays for the MAXSYS (formerly MAXUS) process/apparatus provided by Tech-Metrics International, Inc. (Scottsdale, Ariz.). As shown in FIG. 5A, the following initial "issue" or statement within the category "management responsibility" is displayed: "Quality policy is communicated, understood and maintained throughout the organization." The assessor is then prompted to input, on a sliding bar 0–100% scale, a first numerical input that reflects his or her perception as to how well the assessed process (or system) addresses this issue. As shown in FIG. 5B, the assessor in this example input a first numerical input of 58%.

At this point the assessor is prompted (i.e., the word "yes" is highlighted) to indicate whether the system is demonstrable or not. Such indication may be made by the assessor pressing the "enter" key when "yes" is highlighted. To indicate "no" the assessor may use an input device to move the highlight so that "no" is highlighted instead of "yes," and then pressing the "enter" key. If the first numerical input of 58% is higher than a first value (e.g., higher than 50%), then the assessor may be required to indicate that the assessed system is demonstrable. Otherwise the apparatus may inhibit display of subsequent questions and/or prompt the assessor to provide a new (and in this case a lower and less favorable) first numerical input. In this example the assessor indicated "yes" so subsequent questions were not inhibited and the assessor was not asked to input a new numerical input.

Figure 5C:
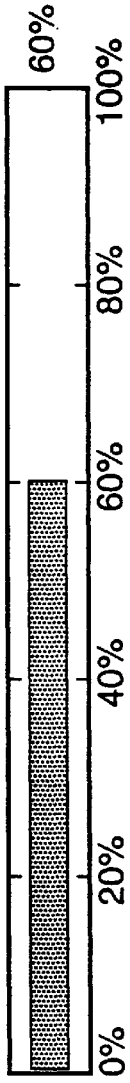

As shown in FIG. 5C, the apparatus then prompted the assessor to indicate whether supporting documentation existed. If the first numerical input (here, 58%) is higher than a second value (e.g., higher than 60%), then the assessor may be required to indicate that supporting documentation exists. Otherwise the apparatus may inhibit display of subsequent questions and/or prompt the assessor to provide a new (and in this case a lower and less favorable) first numerical input. In this example the assessor indicated "yes" so, as shown in FIG. 5D, the apparatus prompted the assessor to identify documents by providing document names.

The "system is demonstrable" and "supporting documentation exists" statements, and their associated "yes or no" questions are filtering mechanisms to help inhibit/prevent collection of exaggerated or untrue data. Using known empirically gathered information, the apparatus may be adapted to have first, second, or subsequent values that serve as "trigger" or "set" points to require higher levels of evidentiary support. The theoretical basis for this apparatus is that, on average, filtered perceptions of quality, as indicated by relatively high first numerical inputs, reflect actual conditions. For instance, in the example shown above, a system must be demonstrable to support a first numerical input rating greater than the first value (here, greater than 50%), and then the system must have supporting documentation to support a first numerical input rating higher than a second value (e.g., higher than 60%).

Figure 5D:
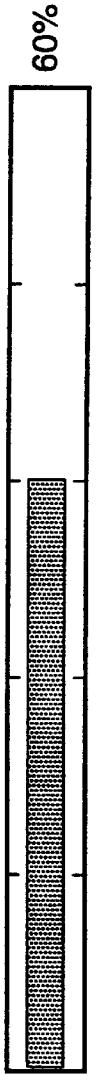
Figure 5E:
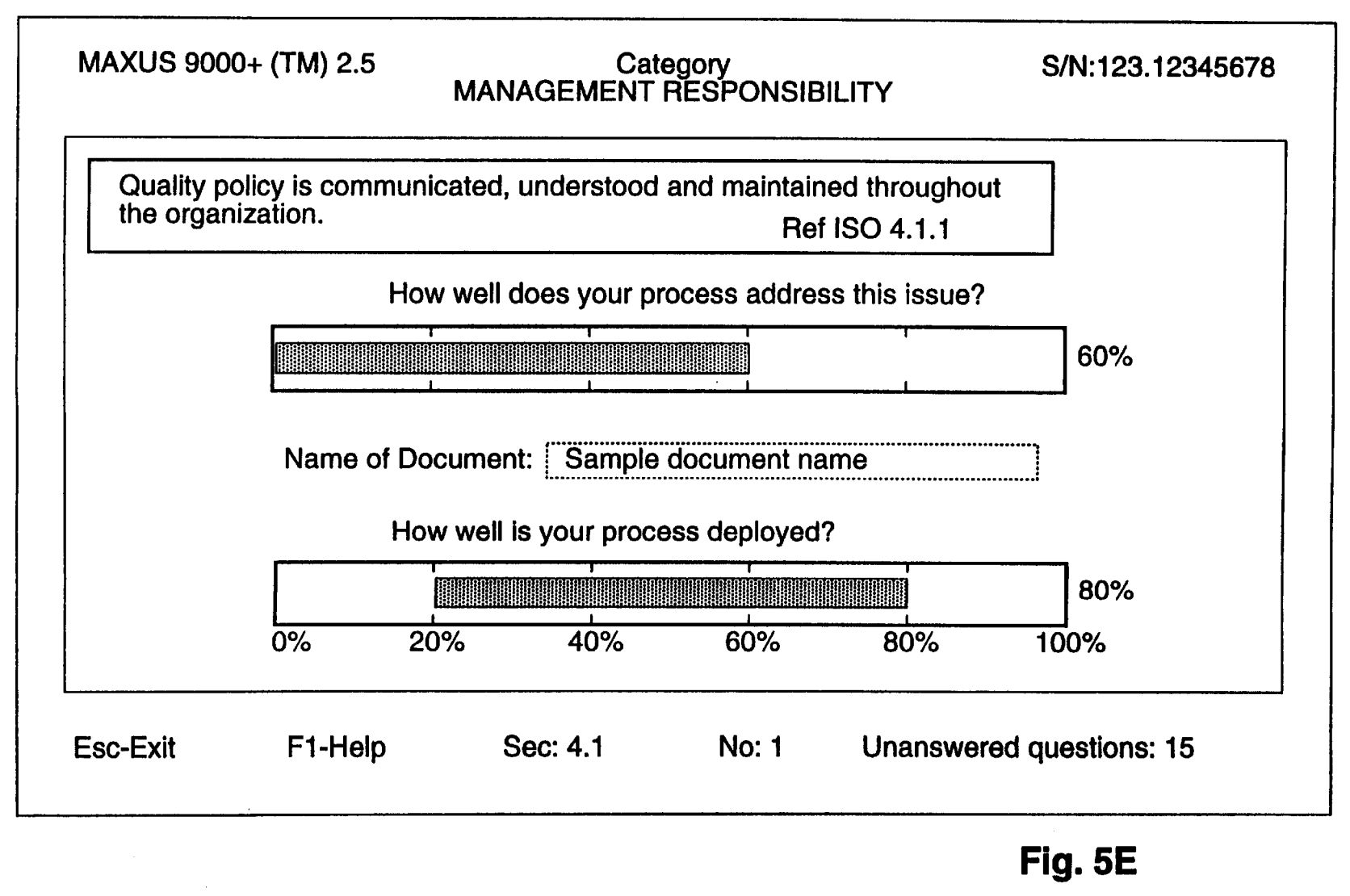

After entering at least one document name in FIG. 5D, the display screen shown in FIG. 5E may be displayed. FIG. 5E prompts the assessor to input a second numerical input which reflects the assessor's perception of how well the process is deployed. In other words, the assessor inputs a numerical evaluation of how extensively the assessed process (or system) is actually used or deployed.

Experiment

Table 2 reflects experimental information collected to verify the ability of an embodiment of the invention to accurately access an organizational system. In this experiment a corporation desired to access five external manufacturing locations operated by five of its suppliers of goods/services. The process/apparatus of the invention was used, as described above in conjunction with Table 1, FIGS. 1–4, and FIGS. 5A–5E, to assess these locations. The results for such assessment is shown in the columns labeled TMI in Table 2. The corporation then conducted manual on-site assessments of the five suppliers. The results of the corporation's assessments for these five suppliers is shown in Table 2 under the columns labeled EML1, EML2, EML3, EML4, and EML5. The difference between the corporation's assessments and the assessments prepared using an embodiment of the invention are shown in Table 2 under the columns labeled "+/−." As shown in the last row of Table 2, the average difference between these assessments was −2.27%, thus indicating that, on average, the assessments using an embodiment of the invention were only 2.27% different from the assessments obtained using manual on-site methods. Since the manual on-site methods are much more expensive and time consuming, these results in Table 2 indicate that an embodiment of the invention may obtain comparable results with a greatly reduced cost. Moreover, the assessments preparing using an embodiment of the invention were slightly lower than those prepared using on-site manual inspections, thus producing a slightly more conservative assessment.

In an embodiment of the invention the apparatus and process of the invention may be adapted to compare numerical inputs (relating to a plurality of issues, or categories of issues) for a plurality of suppliers. In thus manner an objective, relatively quick, and inexpensive assessment of the suppliers may be completed. In thus manner industry standards may be established, and on-site evaluations may be directed to focus their inspection efforts in areas that are below, or not within, industry norms.

Although not specifically illustrated in the drawings, it is understood that other additional and necessary materials, apparatus, and structural components will be provided, and that these and all of the components described above may be arranged and supported in an appropriate fashion to form a complete and operative apparatus or process. It is also understood that variations may be made in the present invention without departing from the spirit and scope of the invention.

What is claimed is:

1. A computer comprising a memory, the memory containing data about an organizational process or system, the data being gathered by the method of:

displaying on a display device computer driven questions, at least some of the computer driven questions being adapted to prompt an assessor who has at least some knowledge about the organizational process or system to numerically input on an input device of the computer the assessor's perception of the capability of the organizational process or system to address an issue;

receiving a first numerical input from the input device of the computer, the first numerical input being stored in a memory of the computer, and the first numerical input reflecting the assessor's perception of the capability of the organizational process or system to address an issue;

comparing within a processing unit of the computer the first numerical input to a first value, and, if the first numerical input has a first predetermined characteristic in relation to the first value, then prompting the assessor to identify evidence that supports the first numerical input, and if evidence is identified that supports the first numerical input, then validating the first numerical input for subsequent evaluation, and if the evidence is not identified that supports the first numerical input, then inhibiting validation of the first numerical input until the evidence is identified or until the first numerical input is changed to have a second predetermined characteristic in relation to the first value;

displaying on the display device computer driven questions that are adapted to prompt the assessor to numerically input a second numerical input on the input device of the computer, the second numerical input reflecting the assessor's perception of how extensively the organizational process or system is deployed; and receiving a second numerical input from the input device of the computer, the second numerical input being stored in a memory of the computer, and the second numerical input reflecting the assessor's perception of how extensively the organizational process or system is deployed.

2. The computer of claim 1 wherein the first predetermined characteristic is defined to mean that the first numerical input has a value at least as great as the first value, and the second predetermined characteristic is defined to mean that the first numerical input has a value that is less than the first value.

3. The computer of claim 1 wherein the first predetermined characteristic is defined to mean that the first numerical input has a value that is less than the first value, and the second predetermined characteristic is defined to mean that the first numerical input has a value that is at least as great as the first value.

4. The computer of claim 1 wherein at least one of the first and second numerical inputs are on a numerical scale, the scale being 1 to 10, 1 to 100, or 0 to 100 percent.

5. The computer of claim 1, wherein if evidence is not identified that supports the first numerical input, then the method further comprises inhibiting the display of subsequent questions until the evidence is identified or until first numerical input is changed to have the second predetermined characteristic in relation to the first value.

6. The computer of claim 1, wherein the method further comprises prompting the assessor to input a third numerical input on an input device of the computer the assessor's perception of how well the organizational process or system functions to address the issue, and receiving the third numerical input from the input device, the third input being stored in a memory of the computer, and the third numerical input reflecting the assessor's perception of the results achieved by the organizational process or system.

7. The computer of claim 1, wherein the method further comprises comparing within a processing unit of the computer the second numerical input to a second value, and, if the second numerical input has a first predetermined characteristic in relation to the second value, then prompting the assessor to identify evidence that supports the second numerical input, and if evidence is identified that supports the second numerical input, then validating the second numerical input for subsequent evaluation, and if the evidence is not identified that supports the second numerical input, then inhibiting validation of the second numerical input until the evidence is identified or until the second numerical input is changed to have a second predetermined characteristic in relation to the second value.

8. The computer claim 7 wherein if evidence is not identified that supports the second numerical input, then the method further comprises inhibiting the display of subsequent questions until the evidence is identified or until second numerical input is changed to have the fourth predetermined characteristic in relation to the second value.

9. The computer of claim 7, wherein the method further comprises comparing within a processing unit of the computer the third numerical input to a third value, and, if the third numerical input has a first predetermined characteristic in relation to the third value, then prompting the assessor to identify evidence that supports the third numerical input, and if evidence is identified that supports the third numerical input, then validating the third numerical input for subsequent evaluation, and if the evidence is not identified that supports the third numerical input, then inhibiting validation of the third numerical input until the evidence is identified or until the third numerical input is changed to have a second predetermined characteristic in relation to the third value.

10. The computer of claim 1, wherein the method further comprises evaluating the organizational process or system by comparing numerical inputs from the assessor with known empirically-gathered information.

11. The computer of claim 1, wherein the method further comprises using the first and second numerical inputs together to evaluate the organizational process or system.

12. The computer of claim 1, wherein the method further comprises multiplying the first numerical input with the second numerical input to evaluate the organizational process or system.

13. The computer of claim 1, wherein the method further comprises using differences between the first numerical input and the second numerical input to evaluate the organizational process or system.

14. The computer of claim 1, wherein the method further comprises receiving first and second numerical inputs from a plurality of assessors, and determining the standard deviation of the first numerical input, and the standard deviation of the second numerical input, from the numerical inputs received from the assessors, and then using a standard deviation to evaluate at least a portion of the organizational process or system.

15. The computer of claim 1 wherein the evidence comprises visible evidence.

16. The computer of claim 1 wherein the evidence comprises supporting documentation.

17. The computer of claim 1 wherein the evidence comprises visible evidence, and wherein the method further comprises comparing within a processing unit of the computer the first numerical input to second value, and, if the first numerical input has a first predetermined characteristic in relation to the second value, the prompting the assessor to identify supporting documentation that supports the first numerical input; and if supporting documentation is identified, then validating the first numerical value for subsequent evaluation, and if the supporting documentation is not identified, then inhibiting the validation of the first numerical input until the supporting documentation is identified or until the first numerical input is changed to have a second predetermined characteristic in relation to the second value.

18. The computer of claim 1, wherein the method further comprises prompting the assessor to input on the input device of the computer an assessment as to whether the organizational process or system is demonstrable, and, if an input is received from the input device that indicates that the organizational process or system is demonstrable, then validating the first numerical input, and, if an input is received from the input device that indicates that the organizational process or system is not demonstrable, then inhibiting validation of the first numerical input until the assessor changes the first numerical input to have a first determined characteristic in relation to a second value.

19. The computer of claim 1, wherein the method further comprises displaying at least one numerical input as a sliding bar on a display device.

20. The computer of claim 1, wherein the computer comprises a processing unit coupled to the memory, and the computer being connected to an input device and a display device.

21. A computer comprising a memory, the memory containing data about an organizational process or system, the data being gathered by the method comprising:

displaying on a display device computer driven questions, at least some of the computer driven questions being adapted to prompt an assessor who has at least some knowledge about the organizational process or system to numerically input on an input device of the computer the assessor's perception of the capability of the organizational process or system to address an issue;

receiving a first numerical input from the input device of the computer, the first numerical input being stored in a memory of the computer, and the first numerical input reflecting the assessor's perception of the capability of the organizational process or system to address an issue;

comparing within a processing unit of the computer the first numerical input to a first value, and, if the first numerical input has a first predetermined characteristic in relation to the first value, then prompting the assessor to identify evidence that supports the first numerical input, and if evidence is identified that supports the first numerical input, then validating the first numerical input for subsequent evaluation, and if the evidence is not identified that supports the first numerical input, then inhibiting validation of the first numerical input until the evidence is identified or until the first numerical input is changed to have a second predetermined characteristic in relation to the first value.

22. The computer of claim 21 wherein the first predetermined characteristic is defined to mean that the first numerical input has a value at least as great as the first value, and the second predetermined characteristic is defined to mean that the first numerical input has a value that is less than the first value.

23. The computer of claim 21 wherein the first predetermined characteristic is defined to mean that the first numerical input has a value that is less than the first value, and the second predetermined characteristic is defined to mean that the first numerical input has a value that is at least as great as the first value.

24. The computer of claim 21 wherein the first numerical input is on a numerical scale, the scale being 1 to 10, 1 to 100, or 0 to 100 percent.

25. The computer of claim 21 wherein if evidence is not identified that supports the first numerical input, then the method further comprises inhibiting the display of subsequent questions until the evidence is identified or until first numerical input is changed to have the second predetermined characteristic in relation to the first value.

26. The computer of claim 21 wherein the method further comprises using the first numerical input to evaluate the organizational process or system.

27. The computer of claim 21 wherein the evidence comprises visible evidence.

28. The computer of claim 21 wherein the evidence comprises supporting documentation.

29. The computer of claim 21 wherein the method further comprises prompting the assessor to input on the input device of the computer an assessment as to whether the organizational process or system is demonstrable, and, if an input is received from the input device that indicates that the organizational process or system is demonstrable, then validating the first numerical input, and, if an input is received from the input device that indicates that the organizational process or system is not demonstrable, then inhibiting validation of the first numerical input until the assessor changes the first numerical input to have a first determined characteristic in relation to a second value.

30. The computer of claim 21 wherein the method further comprises displaying at least one numerical input as a sliding bar on a display device.

31. The computer of claim 21 wherein the computer comprises a processing unit coupled to the memory, and the computer being connected to an input device and a display device.

32. A computer comprising a memory, the memory containing data about an organizational process or system, the data being gathered by the method comprising:

displaying on a display device computer driven questions, at least some of the computer driven questions being adapted to prompt an assessor who has at least some knowledge about the organizational process or system to numerically input on an input device of the computer the assessor's perception of how extensively the organizational process or system is deployed;

receiving a first numerical input from the input device of the computer, the first numerical input being stored in a memory of the computer, and the first numerical input reflecting the assessor's perception of how extensively the organizational process or system is deployed;

comparing within a processing unit of the computer the first numerical input to a first value, and, if the first numerical input has a first predetermined characteristic in relation to the first value, then prompting the assessor to identify evidence that supports the first numerical input, and if evidence is identified that supports the first numerical input, then validating the first numerical input for subsequent evaluation, and if the evidence is not identified that supports the first numerical input, then inhibiting validation of the first numerical input until the evidence is identified or until the first numerical input is changed to have a second predetermined characteristic in relation to the first value.

33. The computer of claim 32 wherein the first predetermined characteristic is defined to mean that the first numerical input has a value at least as great as the first value, and the second predetermined characteristic is defined to mean that the first numerical input has a value that is less than the first value.

34. The computer of claim 32 wherein the first predetermined characteristic is defined to mean that the first numerical input has a value that is less than the first value, and the second predetermined characteristic is defined to mean that the first numerical input has a value that is at least as great as the first value.

35. The computer of claim 32 wherein the first numerical input is on a numerical scale, the scale being 1 to 10, 1 to 100, or 0 to 100 percent.

36. The computer of claim 32 wherein if evidence is not identified that supports the first numerical input, then the method further comprises inhibiting the display of subsequent questions until the evidence is identified or until first numerical input is changed to have the second predetermined characteristic in relation to the first value.

37. The computer of claim 32 wherein the method further comprises using the first numerical input to evaluate the organizational process or system.

38. The computer of claim 32 wherein the evidence comprises visible evidence.

39. The computer of claim 32 wherein the evidence comprises supporting documentation.

40. The computer of claim 32, wherein the method further comprises prompting the assessor to input on the input device of the computer an assessment as to whether the organizational process or system is demonstrable, and, if an input is received from the input device that indicates that the organizational process or system is demonstrable, then validating the first numerical input, and, if an input is received from the input device that indicates that the organizational process or system is not demonstrable, then inhibiting validation of the first numerical input until the assessor changes the first numerical input to have a first determined characteristic in relation to a second value.

41. The computer of claim 32, wherein the method further comprises displaying at least one numerical input as a sliding bar on a display device.

42. The computer of claim 32, wherein the computer comprises a processing unit coupled to the memory, and the computer being connected to an input device and a display device.

* * * * *